(12) United States Patent
Kwiatkowski et al.

(10) Patent No.: US 8,838,533 B2
(45) Date of Patent: Sep. 16, 2014

(54) OPTIMISTIC APPLICATION OF DATA EDITS

(75) Inventors: Paul J. Kwiatkowski, Redmond, WA (US); Shawn A. Van Ness, Renton, WA (US); Nicolas Brun, Seattle, WA (US); Michael A. Nelte, Redmond, WA (US); Arpit S. Shah, Bellevue, WA (US); Paul A. Gusmorino, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 104 days.

(21) Appl. No.: 13/111,951

(22) Filed: May 20, 2011

(65) Prior Publication Data

US 2012/0296875 A1    Nov. 22, 2012

(51) Int. Cl.
*G06F 17/30* (2006.01)

(52) U.S. Cl.
USPC ............................ 707/613; 707/617; 707/626

(58) Field of Classification Search
CPC .................... G06F 17/30345; G06F 17/30348; G06F 17/30351; G06F 17/30368; G06F 17/30377; G06F 17/30386; G06F 17/2241; G06F 17/2247; G06F 17/2288; G06F 17/24
USPC ......... 707/612, 614, 616, 617, 620, 625, 626, 707/633, 634, 638, 694, 695, 703, 704, 707/613; 715/229, 255, 751
See application file for complete search history.

(56) References Cited

U.S. PATENT DOCUMENTS

| | | | |
|---|---|---|---|
| 5,864,850 A | 1/1999 | Nordman | |
| 6,260,125 B1 | 7/2001 | McDowell | |
| 7,200,666 B1 | 4/2007 | Nguyen | |
| 7,480,654 B2 | 1/2009 | Jujjuri et al. | |
| 7,725,456 B2 | 5/2010 | Augustine | |
| 7,761,522 B2 | 7/2010 | Shenfield et al. | |
| 7,890,464 B2 | 2/2011 | Reinsch | |
| 2001/0049635 A1 | 12/2001 | Chung | |
| 2003/0120710 A1* | 6/2003 | Pulsipher et al. | ............. 709/106 |

(Continued)

FOREIGN PATENT DOCUMENTS

| | | |
|---|---|---|
| CN | 101848244 A | 9/2010 |
| CN | 101901152 A | 12/2010 |
| JP | 2002259189 A | 9/2002 |

OTHER PUBLICATIONS

"Conventions for Bound Properties", Retrieved at << http://opensource.adobe.com/wiki/display/flexsdk/Conventions+for+Bound+Properties >>, Feb. 5, 2009, pp. 5.

(Continued)

*Primary Examiner* — Vincent F Boccio
(74) *Attorney, Agent, or Firm* — Tony Azure; Micky Minhas (57) ABSTRACT

A data representation that represents source data at a data source can be maintained. A request to perform an edit can be received from a client, and a request to make the edit to the source data can be sent to the data source. The edit can be optimistically applied to the data representation. Additionally, a change notification can be sent to the client. The change notification can indicate one or more changes to the data representation, where the change(s) resulted from the application of the edit to the data representation. A notification can be received from the data source after applying the edit to the data representation and after sending the change notification. The notification from the data source can indicate whether the edit to the source data succeeded.

20 Claims, 7 Drawing Sheets

(56) References Cited

U.S. PATENT DOCUMENTS

| | | | |
|---|---|---|---|
| 2003/0131051 A1* | 7/2003 | Lection et al. | 709/203 |
| 2003/0131073 A1 | 7/2003 | Lucovsky et al. | |
| 2003/0220984 A1 | 11/2003 | Jones et al. | |
| 2004/0172423 A1 | 9/2004 | Kaasten et al. | |
| 2004/0205692 A1 | 10/2004 | Robinson | |
| 2004/0230903 A1* | 11/2004 | Elza et al. | 715/513 |
| 2004/0267836 A1 | 12/2004 | Armangau et al. | |
| 2005/0021572 A1 | 1/2005 | Ren et al. | |
| 2005/0038791 A1 | 2/2005 | Ven | |
| 2005/0055354 A1 | 3/2005 | Thompson et al. | |
| 2005/0154847 A1 | 7/2005 | Trembecki | |
| 2005/0216441 A1 | 9/2005 | Thomas et al. | |
| 2005/0234997 A1 | 10/2005 | Gu et al. | |
| 2006/0064634 A1* | 3/2006 | Dettinger et al. | 715/511 |
| 2006/0101082 A1 | 5/2006 | Agrawal et al. | |
| 2006/0106888 A1 | 5/2006 | Iida et al. | |
| 2007/0198602 A1 | 8/2007 | Ngo et al. | |
| 2007/0208786 A1 | 9/2007 | Kim | |
| 2007/0288531 A1 | 12/2007 | Motta | |
| 2008/0016151 A1 | 1/2008 | Howard et al. | |
| 2008/0134211 A1 | 6/2008 | Cui | |
| 2008/0140587 A1 | 6/2008 | Corning et al. | |
| 2008/0270486 A1 | 10/2008 | Hind et al. | |
| 2009/0132956 A1 | 5/2009 | Mahasintunan | |
| 2009/0164921 A1 | 6/2009 | Wagner et al. | |
| 2009/0259695 A1 | 10/2009 | Gupta et al. | |
| 2009/0279143 A1 | 11/2009 | St. Jacques, Jr. et al. | |
| 2009/0327403 A1 | 12/2009 | Bhat et al. | |
| 2010/0229052 A1 | 9/2010 | Cuneo et al. | |
| 2011/0055155 A1 | 3/2011 | Page et al. | |
| 2012/0054158 A1 | 3/2012 | Hu et al. | |

OTHER PUBLICATIONS

"Flexible and Powerful Data Binding with WPF", Retrieved at << http://www.devx.com/codemag/Article/40316/1763/page/3 >>, Retrieved Date : Oct. 5, 2010, pp. 3.

Chawathe, et al., "Representing and Querying Changes in Semistructured Data", Retrieved at << http://ieeexplore.ieee.org/stamp/stamp.jsp?tp=&arnumber=655752 >>, Feb. 27, 1998, pp. 10.

"Data Replication for Backup Best Practices", Retrieved at << http://searchdatabackup.techtarget.com/generic/0,295582,sid187_gci1349280,00.html >>, Mar. 2, 2009, pp. 3.

Hsiao, et al., "Tornado: A Capability-Aware Peer-to-Peer Storage Network", Retrieved at << http://urania.cs.ntou.edu.tw/~william/20071220/Tapestry/01213171.pdf >>, Proceedings of the International Parellel and Distributed Processing Symposium, Apr. 26, 2003, pp. 8.

Jansen, et al., "Data Locality in Parallel Rendering",Retrieved at << http://graphics.tudelft.nl/~fwj/PGV98.pdf , 1998, pp. 15.

"Data Binding Overview", Retrieved at << http://msdn.microsoft.com/en-us/library/ms752347.aspx >>, Retrieved Date: Oct. 5, 2010, pp. 13.

Preguica , et al., "Integrating Synchronous and Asynchronous Interactions in Groupware Applications",Retrieved at << http://citeseerx.ist.psu.edu/viewdoc/download?doi=10.1.1.64.6145&rep=rep1&type=pdf >>, Proceedings of CRIWG, Sep. 2005, pp. 16.

Tretola, et al., "Extending Web Services Semantics to Support Asynchronous Invocations and Continuation", Retrieved at << http://ieeexplore.ieee.org/stamp/stamp.jsp?tp=&arnumber=4279601>>, IEEE International Conference on Web Services, Jul. 9, 2007, pp. 8.

"Configuring High Availability for Oracle Fusion Middleware SOA Suite",Retrieved at << http://download.oracle.com/docs/cd/E16764_01/core.1111/e10106/ha_soa.htm >>, Retrieved Date: Oct. 7, 2010, pp. 123.

Costa, et al., "TeenyLIME: Transiently Shared Tuple Space Middleware for Wireless Sensor Networks", Retrieved at << http://www.sics.se/~luca/papers/costa06teenylime.pdf >>, Proceedings of the international workshop on Middleware for sensor networks, 7th International Middleware Conference Nov. 27-Dec. 1, 2006, pp. 6.

"MIRO Announces GOLD™ Version 2005", Retrieved at << http://www.mirotechnologies.com/news-and-events-detail.php?sec=6&sub=34&sub1=161 >>, Dec. 21, 2004, pp. 4.

Kwiatkowski, et al., "Change Notifications From an Updated Data Representation", U.S. Appl. No. 12/962,660, filed Dec. 8, 2010, pp. 37.

Kwiatkowski, et al., "Placeholders Returned for Data Representation Items", U.S. Appl. No. 12/962,662, filed Dec. 8, 2010, pp. 44.

Kwiatkowski, et al., "Data Items Manager", U.S. Appl. No. 13/010,779, filed Jan. 21, 2011, pp. 60.

Office Action, U.S. Appl. No. 12/962,662, filed Dec. 8, 2010, Mailing Date: May 11, 2012, pp. 21.

Office Action, U.S. Appl. No. 12/962,660, filed Dec. 8, 2010, Mailing Date: Nov. 13, 2012, pp. 16.

Office Action, U.S. Appl. No. 13/010,779, filed Jan. 21, 2011, Mailing Date: Nov. 15, 2012, pp. 24.

Gast, Holger, "Managing Proof Documents for Asynchronous Processing", Retrieved at <<http://www-pu.informatik.uni-tuebingen.de/users/gast/files/asyncdoc.pdf>>, Sep. 29, 2008, pp. 15.

Seidenberg, et al., "A Methodology for Asynchronous MultiUser Editing of Semantic Web Ontologies", Retrieved at <<http://www.deltaflow.com/wp-content/pdf/kcapfp10-seidenberg.pdf>>, Oct. 28-31, 2007, pp. 8.

Ignat, et al., "Operation-Based Versus State-Based Merging in Asynchronous Graphical Collaborative Editing", Retrieved at <<http://www.loria.fr/~ignatcla/pmwiki/pub/papers/IgnatCEW04.pdf>>, Retrieved Date: Jan. 24, 2011, pp. 8.

International Search Report, Mailed Date: Jul. 18, 2012, Application No. PCT/US2011/063209, Filed Date: Dec. 4, 2011, pp. 9.

Office Action, U.S. Appl. No. 12/962,660, filed Dec. 8, 2010, Mailing Date: May 11, 2012, pp. 21.

Office Action, U.S. Appl. No. 12/962,660, filed Dec. 8, 2010, Notification Date: May 7, 2013, pp. 14.

Office Action, U.S. Appl. No. 12/962,662, filed Dec. 8, 2010, Notification Date: Mar. 14, 2013, pp. 32.

Office Action, U.S. Appl. No. 13/010,779, filed Jan. 21, 2011, Notification Date: Apr. 26, 2013, pp. 27.

Office Action, U.S. Appl. No. 12/962,660, filed Dec. 8, 2010, Notification Date: Feb. 20, 2014, 8 Pages.

Office Action, U.S. Appl. No. 12/962,660, filed Dec. 8, 2010, Notification Date: Oct. 9, 2013, pp. 14.

Limbic~Region, "Patience Sorting to Find Longest Increasing Subsequence", on May 3, 2006, Last Comment Dated Oct. 7, 2009, 11 Pages.

Office Action, U.S. Appl. No. 13/010,779, filed Jan. 21, 2011, Notification Date: Mar. 4, 2014, pp. 34.

Search Report, Date: Dec. 25, 2013, China Patent Application No. 201210018558.3, Filing Date Jan. 20, 2012, 2 Pages.

Office Action, U.S. Appl. No. 13/010,779, filed Jan. 21, 2011, Notification Date: Jun. 17, 2014, 24 pages.

* cited by examiner

OPTIMISTIC APPLICATION OF DATA EDITS

BACKGROUND

Applications and/or controls may act as clients of local and/or remote data sources. For example, the clients may display data from the data sources, such as in the form of lists. As used herein, a list is an ordered sequence of items, and a client can be an application and/or control. Some data sources, such as local data sources, can respond synchronously to requests for data, with the data source passing the requested data to the requester before the requester resumes execution. Such responses to data requests typically take less time than some response time threshold, such as a threshold that is low enough that a presentation of the response can appear to be in real time with the corresponding request. For example, such responses may take on the order of tens of milliseconds or less. Other data sources, such as remote data sources, may respond asynchronously, with the data requester resuming execution after the request and receiving the requested data from the data source at a later time. Such responses to data requests typically take more time than the response time threshold discussed above.

Some data sources are implemented as read-only data sources. However, in other implementations, clients may be allowed to submit edits to be made to the source data.

SUMMARY

The tools and techniques described herein are directed to handling requests from a client to apply edits to data. In the case of a data source that responds asynchronously, the techniques can include applying optimistic edits to a data representation that represents the source data. For example, the source data may reside in a remote data source, while the data representation may reside in a local cache. As used herein, edits made "optimistically" to the data representation are done in a way that assumes the edits will eventually be successfully made to the data source. Thus, such optimistic edits can represent a state that the source data will be in after those edits are applied, even though the edits may not have been made to the source data yet.

In one embodiment, the tools and techniques can include maintaining a data representation that represents source data at a data source. A request to perform an edit can be received from a client, and a request to make the edit to the source data can be sent to the data source. The edit can be optimistically applied to the data representation. Additionally, a change notification can be sent to the client. The change notification can indicate one or more changes to the data representation, where the change(s) resulted from the application of the edit to the data representation. A notification can be received from the data source after applying the edit to the data representation and after sending the change notification. The notification from the data source can indicate whether the edit to the source data succeeded.

In another embodiment of the tools and techniques, a data representation that represents source data at a data source can be maintained. A request to perform an edit can be received from a client, and a request to make the edit to the source data can be sent to the data source. It can be determined whether the edit to the source data synchronously failed. This synchronous failure determination may not be made immediately upon receiving the request from the client. For example, this may not happen until the edit reaches a head of an edit queue. If the edit to the source data did synchronously fail, the client may be notified of this failure. If the edit did not synchronously fail, then the edit can be applied to the data representation, without waiting to be notified as to whether the edit to the source data succeeded. Additionally, a change notification can be sent to the client. The change notification can indicate one or more changes to the data representation resulting from the application of the edit to the data representation. This notification to the client can also be done without waiting to be notified as to whether the edit to the source data succeeded. Applying the edit or notifying the client "without waiting" does not preclude the possibility of waiting to be notified of success or failure of the edit after applying the edit to the data representation and/or after notifying the client. For example, an items manager may not wait to be notified of success/failure of the edit before applying the edit to the data representation, but may wait to be notified of success or failure of the edit before removing the edit from an edit queue. In some situations when an edit failure occurs at the data source, remaining edits in the edit queue may be undone. This undoing of edits in the edit queue may include sending additional change notifications to the client. These additional change notifications can represent changes that bring the data representation back to an earlier state.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved handling of edit requests for source data. Such improvements may result from the use of various techniques and tools separately or in combination.

Such techniques and tools may include providing a reusable component (an items manager) that presents to a client an interface that behaves as if edits to data items succeed immediately, even if the edits are applied to the underlying data source after a delay. The items manager can synchronously apply the edits optimistically to a data representation having data representation items. For example, the data representation may be stored in a local cache. The items manager can send change notifications back to the client when the edits are made to the data representation (even if the edits have not yet been made to the source data). The client can navigate through the data representation. The change notifications due to the edits requested by the client can have the same form as change notifications due to the data changing for other reasons (e.g., because of changes to the source data by third parties, etc.). This can make implementation of the client simpler. Even though the client may be aware that it caused an edit, the client can apply its own edits to its own data structures without needing a code path that is separate from a code path for other changes. Also, if changes to the data representation are to be undone, the client can be notified of this with these same types of change notifications, and the client can use its same code path for undoing the changes in its own data structures.

The items manager can also maintain a queue of outstanding edits. The items manager may use one of various different techniques for adding edits to the queue. For example, the items manager may add all the edits to the queue. Alternatively, if the queue were empty, the items manager could determine whether an edit completed synchronously, and only queue the edit if the edit did not complete synchronously. The items manager can send edits from the queue to the data source in sequence. When the items manager receives a notification of success back for an edit at the head of the queue, the items manager can dequeue that edit, and can send the next edit (which is now at the head of the queue) to the data source. By waiting for a success or failure notification from the data source for each edit before sending the next edit request to the data source, the edits can be applied to the source data in the same order in which they were received and entered in the queue. If an edit fails, the items manager can undo the queued edits (including the failing one) in the data representation in reverse order. The edits can also be removed from the queue. Such queuing operations can allow multiple edits to be applied to the data representation in rapid succession, even if it will take some time to apply the edits to the source data.

In the event of a loss of a connection to the data source, the items manager can notify the client of this incident, but can spare the client the details of reattempting the edits the next time the data is refreshed by the client. In the event of a deletion failure because the edit was no longer meaningful (as indicated by a notification from the data source), the items manager can continue with the other edits in the queue. In the event of other kinds of failures, the items manager can notify the client, undo the remaining edits (in reverse order) in the cache, and discard the edit queue. In the event of an edit that conflicts with a current state of the source data (for example, the items manager may conclude that a no-longer-meaningful type of notification from the data source is due to such a conflict), the items manager can conduct a generic refresh algorithm that generates change notifications to return the data representation to a state consistent with the source data. Also, when data fetched from the data source reveals an inconsistency between the data representation and the source data (as detected by the items manager), the items manager can attempt to complete queued edits before beginning the refresh operation.

Accordingly, one or more benefits may be realized from the data editing tools and techniques described herein. For example, the client may provide feedback to a user as soon as edits are attempted, rather than making a user wait for the network round trip to the data source, which at times can be quite long. In particular, because in most systems the vast majority of edits succeed, acting as if edits have succeeded immediately can allow multiple edits to be made naturally in rapid succession, even if the first edit has not yet been fully implemented in the network data source. In cases when an edit cannot be completed, the items manager can handle this well. In cases where a network connection is briefly lost, the items manager can re-attempt the edits autonomously, taking this burden off of the client.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
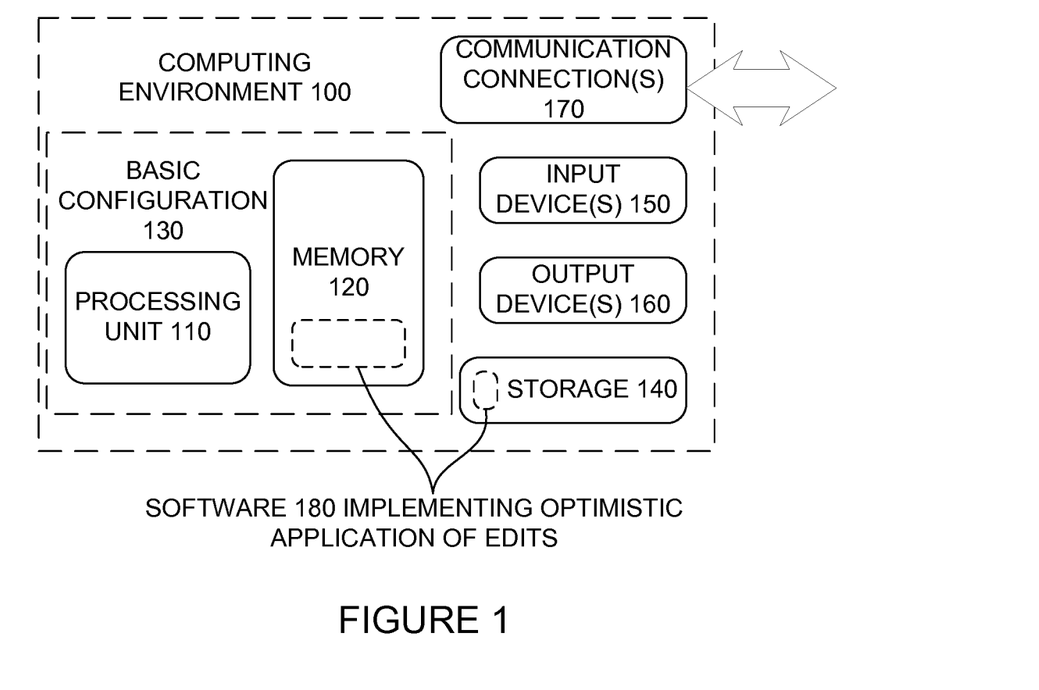
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a data source, client, and/or items manager environment. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing optimistic application of data edits.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. System and Environment for Optimistic Application of Edits

A. General System and Environment

Figure 2:
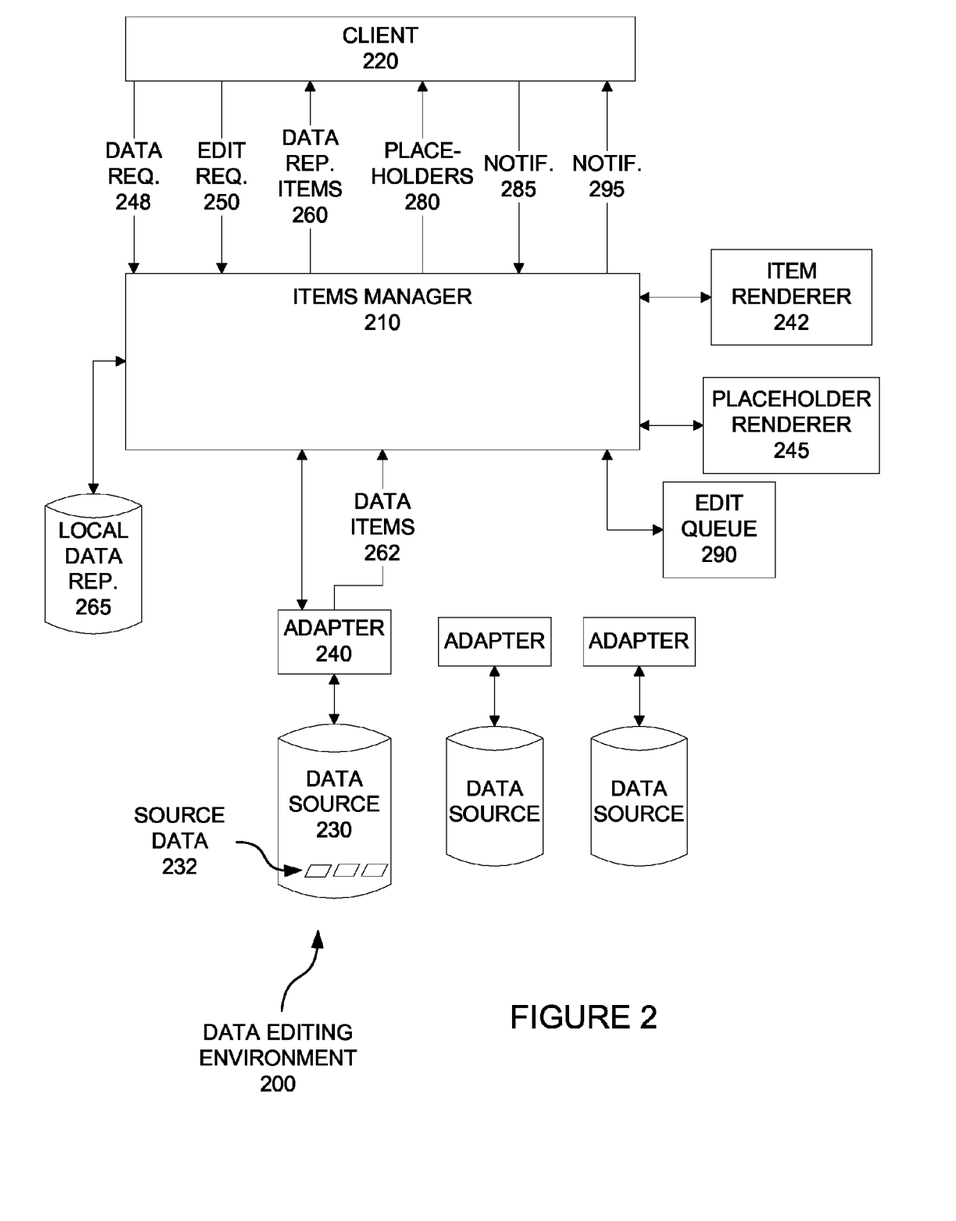
FIG. 2 is a schematic diagram of a data editing environment.

FIG. 2 is a schematic diagram of a data editing environment (200) in conjunction with which one or more of the described embodiments may be implemented. The data editing environment (200) can include an items manager (210), which can be a software component or module. The items manager (210) can communicate with a client (220), and with a data source (230) that stores source data (232). The data source (230) can be one of various different types of data sources (illustrated by the other data sources in FIG. 2). The items manager (210) may also communicate with one or more other clients and/or one or more other data sources. The items manager (210) may communicate with the data source (230) through a domain-specific data source adapter (240), which can be configured for a particular type of data source. The items manager (210) may also communicate with an item renderer (242) and a placeholder renderer (245) if the items manager (210) is to send rendered versions of data representation items to the client (220). The various components shown in FIG. 2 may be in a single computing environment such as the computing environment (100) discussed above, or they may be spread across multiple computing environments in one of various different configurations.

The items manager (210) can receive one or more data requests (248) from the client (220) for representation item(s) representing one or more items from the data source (230), or one or more edit requests (250) for edits to be made to the local data representation (265) and the source data (232).

B. Providing Data Representation Items to the Client

In response to a request to fetch data representation items, the items manager (210) can fetch the data representation items (260) from the data source (230) through the adapter (240) or from a local data representation (265) (if the requested data representation items have already been fetched from the data source (230)). For example, the items manager (210) can send one or more requests to the data source (230), and the data source (230) can return data representation items (260) to the items manager (210) through the adapter (240). The data representation items (260) may change form as they are sent from the data source (230) to the client (220). As just one example, the adapter (240) may convert the data representation items (260) to an array of ECMAScript objects and forward those objects to the items manager (210). The items manager (210) may send the ECMAScript objects to an item renderer (242), and the item renderer may return the data representation items (260) to the items manager as HTML Document Object Model elements, and the items manager (210) may forward those HTML Document Object Model elements to the client (220). The data representation items (260) may take any of various other forms. For example, the items manager (210) may send un-rendered versions of the data representation items (260) to the client (220), and the client (220) may use the data representation items (260) for uses other than display.

The items manager (210) may maintain the local data representation (265) that represents a subset of a larger data set maintained by the data source (230). For example, the local data representation (265) may only include data representation items (260) for items that are currently displayed in a list (which could be displayed in various forms, such as in a vertically-extending list, in a grid, as thumbnails, etc.) by the client (220) and possibly some related data representation items (260). For example, the local data representation (265) may also include data representation items (260) for neighbors of items that are currently displayed, items that have recently been displayed, etc. However, the items manager (210) may virtualize the local data representation (265) to make it seem to the client (220) as though the items manager (210) has downloaded the entire data set from the data source (230). For example, the items manager (210) may fetch and provide the client (220) with information on a total number of items in the data set of the data source (230) so that the client (220) can take appropriate actions, such as sizing and locating a scroll bar appropriately for the overall data set of the data source (230).

If the client (220) sends the items manager (210) a request (248) for a representation item that the items manager (210) has not yet retrieved from the data source (230), the items manager (210) can return to the client (220) a placeholder (280) until the items manager (210) successfully fetches the representation item (260) from the data source (230). The items manager (210) may also include the placeholder (280) in the local data representation (265), where the placeholder (280) can be used for recordkeeping purposes, such as to be matched with a corresponding data representation item (260) when the data representation item (260) is returned from the data source (230). Additionally, the client (220) may use the placeholder for various purposes such as recordkeeping and for displaying in lieu of the actual data representation item (260) until the data representation item (260) is returned.

A placeholder (280) can take any of various forms. For example, the placeholder(s) and the actual data representation items (260) in the local data representation (265) may be in the form of rendered HTML Document Object Model elements formed by the placeholder renderer (245) in response to requests from the items manager (210). Alternatively, the placeholders (280) may take some other form, such as the form of opaque handles, or some other data type. Additionally, the placeholders (280) in the local data representation (265) may be in a different form from the placeholders (280) returned to the client (220) in response to requests (248) from the client (220).

C. Optimistic Application of Edits

In addition to providing data representation items to the client (220), the environment (200) can allow the client (220) to request edits. The edits can be made to the local data representation (265) and to the source data (232).

The client (220) can send a request (250) for an edit. This may be done in any of various different ways, such as sending messages, making application programming interface calls, etc. In one implementation, the client (220) can send a request (250) for an edit by calling an interface of the items manager (210), and passing the items manager (210) a callback function to call when the edit has been completed. The client (220) may also send batch notifications (285) to the items manager. For example, the client (220) may batch edit requests (250) by sending a "begin edits" notification at the beginning of a batch of edit requests (250), and by sending an "end edits" notification at the end of a batch. If the client (220) does not send such notifications, the items manager (210) may infer a begin edits notification before each edit request (250) and an end edits notification after each edit request (250).

In response to a request (250) for an edit to be made, the items manager (210) can generate a reversible description of the edit (i.e., a sufficient description to allow the edit to be undone). For example, in the case of a deletion, in addition to storing an indication of which item is being deleted, the items manager (210) can store data for the item and can store indications of the adjacent items in the local data representation (265). Accordingly, if at some later time the deletion edit is to be undone in the local data representation (265), the items manager (210) can generate an insertion operation for a new item with the given data, between those items in the data representation. For different kinds of data structures, this reversible description may include different information, such as indications of whether parent or child relationships exist between items, etc.

A data structure representing the edit can be appended to a queue (290). Appending such a data structure to the queue (290) is referred to herein as including the edit itself in the queue, for simplicity in the description. The data structure in the queue (290) can include, or link to, the reversible description discussed above. The queue (290) can be managed using a first-in-first-out (FIFO) technique so that edits can be done in the same order in which requests for the edits were received from the client (220).

When the edit gets to a head of the queue so that the edit is now first in line (e.g., has been in the queue (290) the longest), or if the queue (290) contains just this one edit, the items manager (210) can attempt the edit. For example, the items manager (210) can call a method for the requested type of edit (insert, delete, move, change, replace, etc.) on a data source adapter object, which can in turn communicate the request to the underlying data source (230) via the data source adaptor (240).

The items manager (210) can determine whether the edit has synchronously failed, or whether the edit will have some other outcome, such as where the edit succeeds synchronously or the request for the edit is to be handled asynchronously. For example, the items manager (210) can maintain a data structure for a particular edit, and a bit on that data structure can be set to true if the particular edit failed. As specified in the original calling code for the items manager (210), after the items manager (210) passes the callback function to the adapter (240), the items manager (210) can check the "edit failed" bit. If the "edit failed" bit is false (indicating that the edit already succeeded or the adapter (240) has not yet called back), then the items manager (210) can apply the edit to the local data representation (265). Alternatively, the items manager (210) may determine whether the edit synchronously failed in some other manner, such as by being expressly informed of this by the adapter (240). The items manager (210) can also send an appropriate notification (295) to the client. If this is the first edit in a batched sequence (as indicated by a begin edits notification from the client (220) or as inferred by the items manager (210)), the items manager (210) can send a "begin notifications" notification (295). If there are no edits queued, the items manager (210) can complete the edit sequence, as discussed below.

As noted above, when the items manager (210) attempts an edit (such as by calling a method on the data source adapter (240)), the items manager (210) can pass a callback function (which may be considered to be part of the items manager (210)) to the adaptor (240).

The callback function may be called synchronously or asynchronously. When the callback function is called, the function can perform different tasks depending on the outcome of the edit. For example, if the edit succeeded, the function can dequeue the edit from the edit queue (290). Additionally, the callback function may update data for the key for a data item if such a key has been successfully assigned or changed by the data source (230). If the connection to the data source (230) has been lost, the callback function can set a Boolean value indicating that the items manager (210) is to wait for the next refresh operation (discussed more below) before attempting more edits. Also, in this situation, the items manager (210) can send a status notification (295) to the client (220), notifying the client (220) that the connection with the data source (230) is in a state of error. When the connection is restored, the items manager (210) can send the client (220) another status notification (295), notifying the client that the connection with the data source is no longer in a state of error. The items manager (210) may send various different status notifications (295) to the client, notifying the client (220) of the current status. For example, the status notifications (295) can include notifications (295) for an outstanding edits status, an edits completed (or ready) status, and an error status. For example, the error status notification can be sent when an edit failed or network connectivity is lost. If the data source (230) reports that the edit is not permitted, then the edit queue may be discarded, as is discussed more below. In this situation, the items manager may also send the client (220) a status notification (295) indicating that there is a state of error.

If the data source (230) reports that the edit is no longer meaningful (e.g., due to another party editing the data source in a conflicting manner), the response by the callback function can depend on whether the edit was a deletion. If the edit was a deletion, then the callback function can dequeue the edit; otherwise, the callback function can discard the edit queue. Whether or not the edit was a deletion, the callback function can request a refresh, because the no longer meaningful failure indicates that the data representation (265) is now out of sync with the source data (232).

After the callback function takes one of the above actions, if the Boolean value mentioned above has not been set, the next edit can be attempted. To attempt the next edit, the items manager (210) can determine whether there is at least one edit in the queue (290), and if so, the items manager can attempt the edit at the head of the queue (290). The items manager (210) can also determine whether that edit completed synchronously. If so, the items manager can attempt the next edit after the one that just completed.

To complete a batched edit sequence (when the items manager (210) has inferred or been sent an end edits notification), the items manager (210) can update the indices of all items in the data representation (265) and send appropriate notifications to the client. Updating indices can be done more efficiently for the whole batched sequence than if the indices are updated after each edit in the sequence. The items manager (210) can send an "end notifications" notification (295) to the client (220). This "end notifications" notification (295) and the corresponding "begin notifications" notification (295) noted above can define a beginning and end of a batch of notifications. A client, which is to alter its state in response to changes in the data, can process the known outstanding changes at one time. In other words, the client may postpone various internal changes to its data structures until the latest changes (the changes in the batch) have been taken into account. Also, the items manager (210) can determine whether a refresh operation has been requested, and if so, then the items manager (210) can start a refresh operation, as discussed below.

To discard the edit queue (290), the items manager (210) can walk through the edit queue (290) from the last queued edit to the first queued edit (i.e., walk through the edits in reverse order), and undo the queued edits. The items manager (210) can also discard the queued data structures. Additionally, the items manager (210) can execute the code to complete an edit sequence, as discussed above.

This data editing feature can also benefit from some acts in the refresh operation discussed below. For example, if the Boolean value discussed above has been set, it can be cleared when the refresh operation is performed. Also, if there are edits in the queue (290), the next edit in the queue (290) can be attempted (as discussed above) before the refresh operation proceeds. Additionally, if there are edits in the queue (290) when the refresh operation is called, the refresh operation can be aborted and tried again when the edit sequence is completed and the queue has no more edits.

Figure 3:
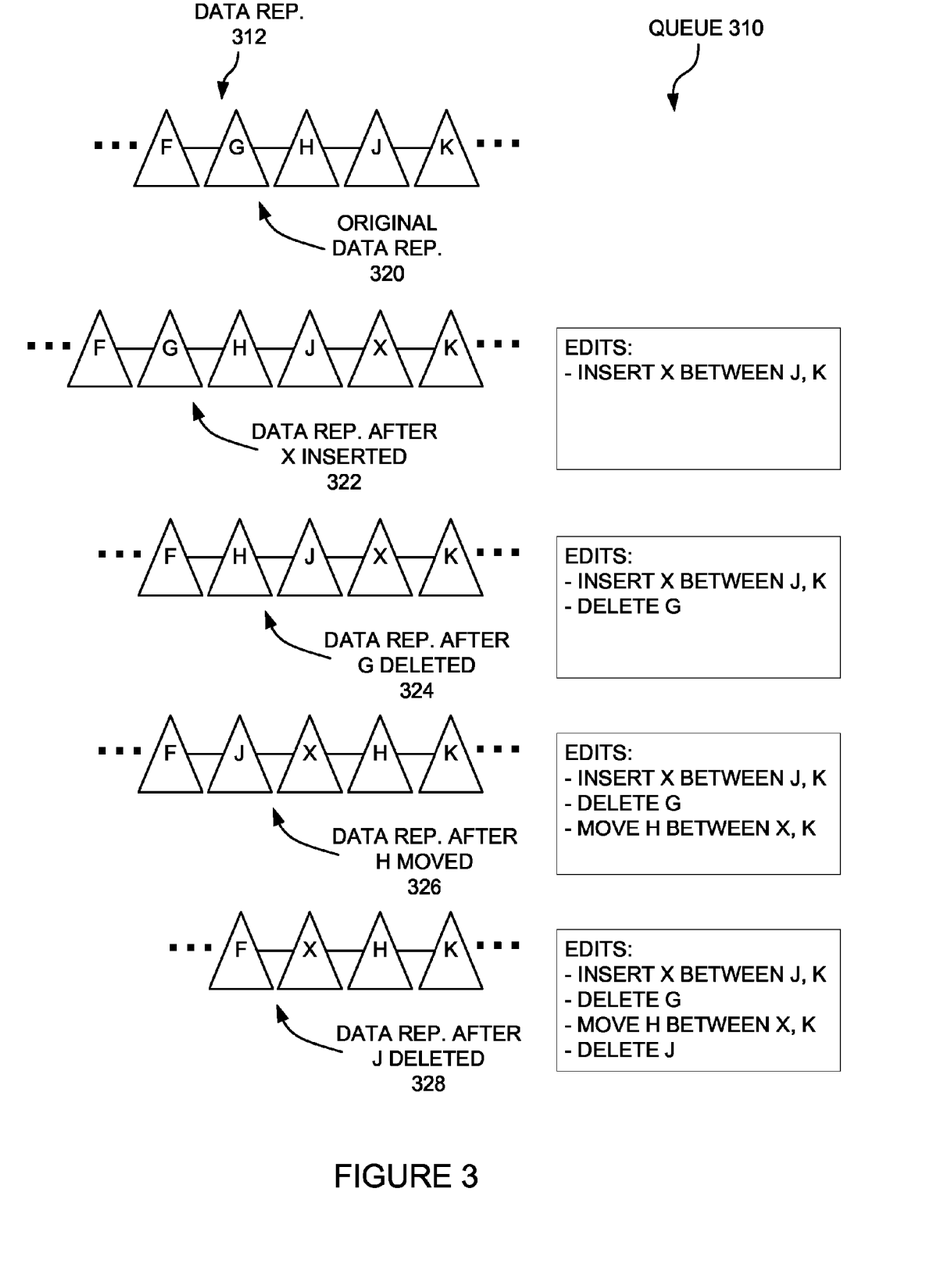
FIG. 3 is a schematic diagram illustrating a data representation and an edit queue as edits are added to the queue.
Figure 4:
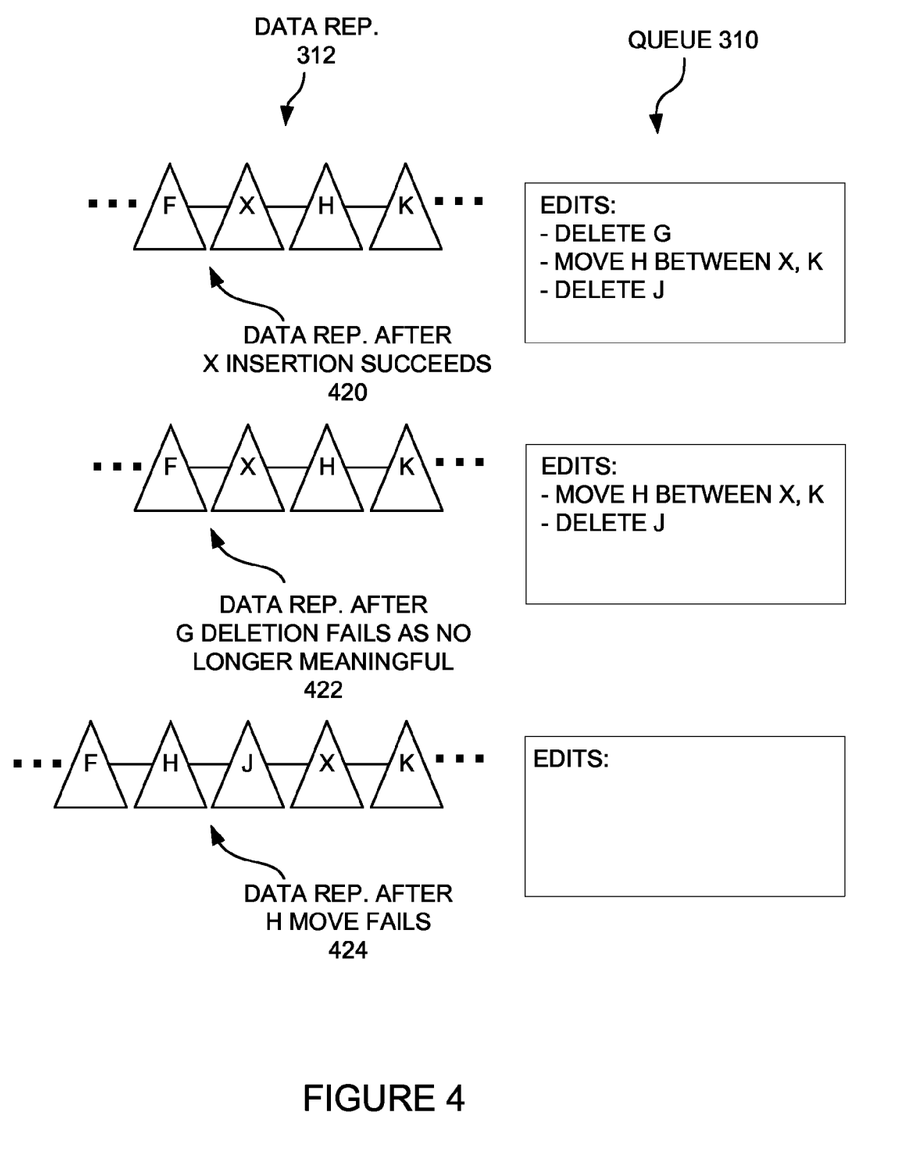
FIG. 4 is a schematic diagram illustrating a data representation and an edit queue as edits in an edit queue are processed.

Referring now to FIGS. 3-4, an example of adding edits to an edit queue will be discussed with reference to FIG. 3, followed by an example of processing and removing the edits from that same queue with reference to FIG. 4. Edits can be processed and removed from a queue at the same time as or between other edits being added to the queue, but these two acts are separated in FIGS. 3-4 for the sake of simplicity and clarity in the figures and in this description.

The left side of FIG. 3 illustrates a data representation (312) (actually a portion of the data representation in the form of a list) with triangles illustrating data representation items. The right side of FIG. 3 illustrates edits in a queue (310) as edits are added to the queue (310) and optimistically applied in the data representation (312), which can be before it is known whether the edits will be successfully applied in corresponding source data (not shown).

An original data representation (320) includes data representation items in the following order in a list: F, G, H, J, K. The queue (310) can receive an edit to insert item X between items J and K. This insertion can be applied to the data representation (312), resulting in a data representation (322) after the insertion of item X that is ordered as follows: F, G, H, J, X, K.

The queue (310) can then receive an edit to delete item G. This deletion can be applied to the data representation (312), resulting in the data representation (324) after the deletion of item G. The queue (310) can then receive an edit to move item H between items X and K. This deletion can be applied to the data representation (312), resulting in the data representation (326) after the move of item H, ordered as follows: F, J, X, H, K. Finally, the queue (310) can receive an edit to delete item J. This deletion can be applied to the data representation (312), resulting in the data representation (328) after the deletion of item J. Accordingly, all these edits in the queue (310) have been applied optimistically, assuming that the edits will be successfully applied at the data source. The result is the data representation (328) with the following item order: F, X, H, K. The edits can be applied to the data representation (312) even though the edits are still in the queue, and no confirmation has been received from the data source for those edits.

Referring now to FIG. 4, the data representation (312) is again illustrated on the left side, while the queue (310) is illustrated on the right side, similar to FIG. 3. However, FIG. 4 illustrates the data representation (312) and the queue (310) being processed as notifications are received back from the data source, indicating whether the edits were successfully applied to the source data.

The data representation (420) after the insertion of X succeeds is the same as before the insertion succeeded. This is because this edit was already optimistically applied to the data representation (312), as discussed above. However, the edit ("INSERT X BETWEEN J, K") is removed from the queue (310).

Moreover, the data representation (422) after the deletion of G failed as no longer meaningful also remains unchanged. This is because a no longer meaningful failure of the deletion of an item can indicate that the item is no longer present in the source data. Accordingly, the item need not be inserted back into the data representation (312). The G deletion edit can be removed from the queue (310), and the other edits can remain in the queue (310). If the deletion of G had failed because it was not permitted, the edits in the queue (310), including the deletion of G, could be undone in reverse order.

The bottom row of FIG. 4 depicts the result of processing after receiving a notice from the data source that the move of H failed. Because of this failure, the edits in the queue (310), including the move of H, can be undone in reverse order. Accordingly, the deletion of J can be undone, and then the move of H can be undone. Undoing these edits can result in the data representation (424) after the H move fails, with items in the following order: F, H, J, X, and K. Additionally, the edits in the queue can be discarded, as illustrated by the bottom illustration of the queue (310) in FIG. 4 not listing any edits.

D. Data Representation Refresh Operations

As noted above, refresh operations can be performed in some situations, such as where a connection has been lost or a no longer meaningful failure notice is received. Accordingly, an example of conducting such a refresh operation will now be described. Referring back to FIG. 2, the items manager (210) can initiate a refresh operation that can generate a set of change notifications when data representation items are updated. To begin the refresh operation, an updated representation of an updated set of source data (232) in the data source (230) can be fetched by the items manager (210). A change notification set can be generated by comparing the updated representation with an original representation. The change notification set can represent a possible set of changes that yield the updated representation when starting with the original representation. The possible set of changes can include fewer changes than an alternative set of changes that would, for example, represent deletion of all items in the original set of data and insertion of all items in the updated set of data. The change notification set can be sent to the client (220).

The refresh operation may be done in three main steps to be performed by the items manager (210): detecting that the current local data representation (265) is out of date compared to the source data (232) in the data source (230), fetching an updated representation in the form of data representation items (260) to replace all or part of the local data representation (265), and comparing the original and updated versions of the updated local data representation (265) to generate the change notifications. Each of these will be discussed below.

1. Detecting Out-of-Date Local Data Representation

Detecting that the local data representation (265) is out of date may be bypassed if a refresh operation (i.e., fetching an updated representation in the form of data representation items (260) to replace all or part of the local data representation (265), and comparing the original and updated versions of the updated local data representation (265) to generate change notifications (295)) is requested, such as by the client (220). The client (220) can request a refresh operation via the items manager interface, such as by calling a method (e.g., by calling "void refresh( )"). For example, the client (220) may be configured to periodically request a refresh operation, or a refresh operation may be requested by user input. Additionally, the items manager (210) or the adapter (240) can initiate a refresh operation autonomously, such as when the items manager (210) or the adapter (240) has detected that the local data representation (265) is out of date.

An out-of-date local data representation (265) may be detected when the client (220) requests additional data representation items (260). The items manager (210) may request an overlapping portion of the already-fetched local data representation (265) in addition to requesting the new data items (262) requested by the client (220). The items manager (210) can process batches of data items (262) when they arrive from the data source (230). Each time a batch arrives, the items manager (210) can compare overlap, if any, with data representation items (260) representing previously-returned data items (262) for consistency. For example, if a data representation item K was previously after an item J, but now it is after an item H, something has changed, even if the client's most recent request was for item K only. If indices are provided for data items (262) in a list, a change in a data item's index can also indicate a change to one or more other data items (262) in the source data (232). Additionally, the data source's response to an edit request may indicate on out-of-date local data representation (265), such as when the data source (230) returns a no longer meaningful failure notice in response to a request for an edit to be made to the source data (232).

The items manager (210) may attempt to determine what has changed and fetch a subset of the new data that is determined to have changed. Alternatively, all the data representation items (260) that are in the local data representation (265) (which may be all the data representation items (260) that the client (220) is currently maintaining handles to) can be re-fetched by the items manager (210). A discussion of this fetching follows.

2. Fetching Updated Data Representation

When fetching an updated data representation as part of a refresh operation, the items manager (210) can enter a different mode of operation. In this mode, the items manager (210) can ignore data items (262) that arrive due to requests that were sent before this mode was entered. Additionally, while in this mode, the items manager (210) may communicate with the data source (230) to fetch batches of data until the items manager (210) has a consistent "snapshot", i.e., a complete updated local data representation (265) of the portion of the data (232) in the data source (230) that corresponds to the original local data representation (265) (i.e., the local data representation already available to the items manager (210)). Various heuristics could be used by the items manager (210) to obtain such a snapshot. In one implementation, which can be used for lists of data representation items, attempts to re-obtain an instantiated sub-list in as few requests as possible can be performed, and the items manager (210) can examine each batch of results to see what still needs to be requested. In this approach, a data representation item (260) in the original local data representation (265) may be considered deleted if a request for that specific item fails, but until such a failure occurs or the data representation item (260) is successfully re-fetched, the item can be considered an item that is still to be fetched in the refresh operation.

If the items manager (210) finds a contradiction between batches of received data items (262), the fetching process can begin anew and data items (262) for all the data representation items (260) in the local data representation (265) can be requested once again. For example, this may occur if source data (232) changes in the data source (230) between times when different batches of data items (262) are sent.

While the items manager (210) is in its refresh mode, it can discontinue requesting new data items (262) from the data source (230). However, the items manager (210) can continue to process requests from the client (220) by returning placeholders (280) in response to the requests. Alternatively, the items manager (210) may fulfill some client requests if the fulfillment of those requests is accounted for in the process of performing the refresh operation.

3. Compare Representations and Generate Change Notifications

Generating the change notifications may be done in any of various ways. For example, the set of change notifications could represent the deletion of all the data representation items (260) in the original local data representation (265) and the insertion of all the data representation items (260) in the updated local data representation (265). However, such a set of change notifications may not provide the client (220) with enough information to communicate the changes to users in helpful ways.

Alternatively, the items manager (210) can generate a set of change notifications representing a set of changes that is plausible even if the true sequence of changes to the data set in the data source (230) is unknown to the items manager (210). This may be done by the items manager (210) using techniques that can decrease the number of changes represented by the change notifications, so that the number of changes is less than other potential sets of changes, such as if the changes included the deletion of all the data representation items (260) in the original local data representation (265) and the insertion of all the data representation items (260) in the updated local data representation (265). The client (220) can use such a set of change notifications to communicate the changes to users in various ways. For example, the client (220) may provide animations to highlight the changes. Additionally, the client (220) can communicate the changes in other ways. For example, if an item that happened to be displayed at the top of a screen showing a list of data representation items (260) is moved to another part of the data set in the data source (230), the client can leave the visible window scrolled to its original location (and show all the subsequent data representation items (260)), rather than scrolling the window just to keep that one item at the top of the screen.

Following is a description of one implementation of a technique that the items manager (210) can use to generate the change notifications. Overall, this technique can gradually alter the original local data representation (265) until it matches the updated local data representation (265). This technique will be described with reference to FIG. 5, which illustrates a specific example of a portion of an original local data representation (510), received updated data items (520) that were fetched in a refresh operation, and a resulting portion of an updated local data representation (530) after the list generation technique has been run.

Figure 5:
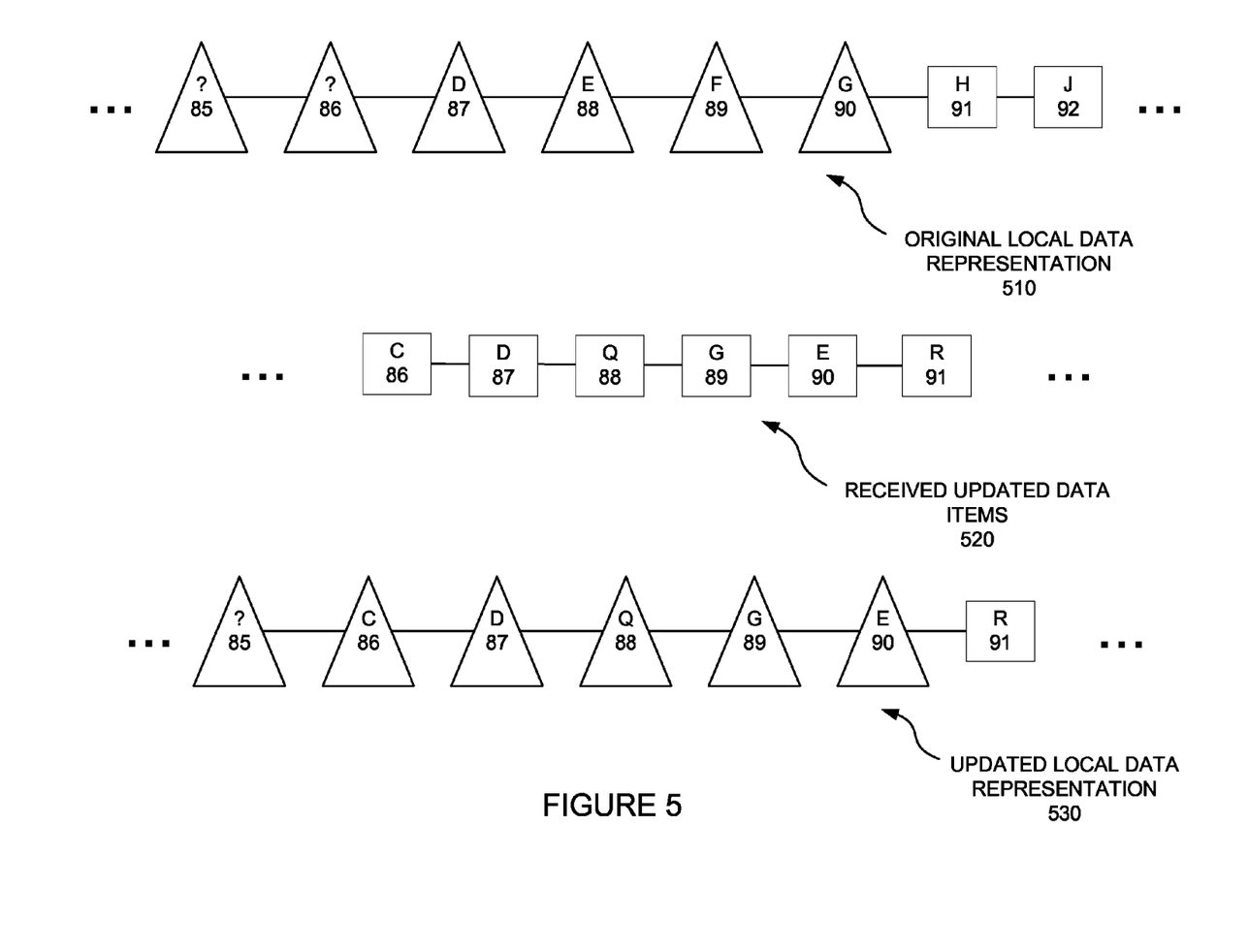
FIG. 5 is a schematic diagram illustrating a data representation and fetched data items.

In FIG. 5, as in FIGS. 3-4 above, items are listed in their order in the representation, which may also be in order of the items' indices, as illustrated. In FIG. 5, triangles with question marks illustrate placeholders, triangles with capital letters illustrate data representation items that have been requested by the client and instantiated (e.g., rendered as UI descriptions that are sent to the client), and boxes with letters illustrate data representation items that have been returned from the data source but not requested by the client and not yet instantiated. The numbers below the question marks or capital letters indicate the index numbers for the items in the overall data set in the data source. Additionally, the capital letters can represent keys for the data representation items.

The original data representation (510) is illustrated as including two placeholders with indices 85 and 86 (representing items that had been requested by the client but not yet returned by the items manager), followed by instantiated data representation items D, E, F, and G with respective indices 87, 88, 89, and 90, and then followed by unrequested data items H and J, with respective indices 91 and 92. The received updated data items (520) include items C, D, Q, G, E, and R with respective indices 86, 87, 88, 89, 90, and 91. The received updated data items (520) can be compared to the original local data representation (510) to generate change notifications to be sent to the client. A technique for generating those change notifications will now be described.

In the technique, items that appear in the original local data representation (510), but not in the received updated data items (520), can be found. Remove-type change notifications can be sent for such items, and the items can be removed. For example, a remove-type notification for item F can be sent to the client, and item F can be removed from the local data representation. During this operation, access of the client can be limited so that the client is not permitted to observe indices on the items because such indices may be inconsistent. Alternatively, a client may be permitted to see such indices if the indices are changed and the client is informed of the index changes when other changes are made that may affect the indices. As yet another alternative, a client may be allowed to see indices even if the indices are inconsistent.

The technique can further include finding placeholders generated for items requested by index, and matching those placeholders to those items. For example, if the placeholders with indices 85 and 86 in the original local data representation were requested by index, this could include matching the placeholder having an index of 86 in the original local data representation (510) with the item C having the index 86 in the received updated data items (520). This can be done before moving placeholders in the data representation to prevent placeholders for items requested by index from moving, because such movements of index-requested placeholders could result in a placeholder being matched with an item having an index other than the one requested.

While not illustrated in FIG. 5, the received updated data items (520) may be spread across multiple non-contiguous ranges. For example, this may occur because the client may be allowed to retain handles to non-contiguous ranges, so the original local data representation (510) may include multiple non-contiguous ranges of representation items requested by the client. Additionally, the items manager may request only a limited range around each item in the original local data representation (510). The technique can include determining a match for each range in the received updated data items. For example, the match can include a range in the original local data representation (510) that shares the most individual items with the matching range in the received updated data items (520). In some cases, ranges in the original local data representation (510) may be merged if the merged range maps to a range in the received updated data items (520).

In the received updated data items (520), boundaries of each range outside which all items do not appear in the original local data representation (510) can be marked. For example, this can include marking a boundary between items E and R in and between items C and D in the received updated data items (520). These boundaries can distinguish between items that appear to have simply not been observed yet (e.g., items C and R) and items that have been inserted into the data set in the data source (e.g., item Q).

Of the items that appear in each range of the received updated data items (520) and its matched range in the original local data representation, a set of items that do not need to be moved relative to one another can be identified and marked as being stationary. This can be done in such a way that the number of such stationary items is increased and accordingly the number of move-type change notifications can be decreased. For example, with a list this can include assigning ordinals to the items in the original local data representation (510), and then finding the "longest ordered subsequence" of those ordinals in the received updated data items. As an example, this can be done using a portion of the known "patience sorting" technique. In the illustrated example of FIG. 5, this can result in identifying D and G as stationary, where D and G form the longest ordered subsequence. (Alternatively, the technique could have identified D and E as stationary with the same size ordered subsequence.)

If there are placeholders inside the marked boundaries discussed above, attempts can be made to match these placeholders to items in the received updated data items (520) that do not appear in the original local data representation (510), based on neighbors that appear in both data sets. For example, if the placeholder with index 86 had not already been matched with item C because of matching index values, that placeholder could be matched with item C because item C and the placeholder have the same neighbor (item D).

The technique may include sending a move-type change notification for the non-stationary items that are in both the received updated data items (520) and the original local data representation (510). The moves can be performed in the local data representation. For example, this can include sending a move-type notification for item E and moving item E to be after item G in the local data representation. When generating and sending these notifications, the client's access can be limited. For example, the client may be allowed to observe the neighbors of an item, but not the indices for the items.

The technique can further include finding new items that appear in the received updated data items (520), but not the original local data representation (510). These new items can be added to the local data representation, and corresponding inserted-type change notifications can be sent to the client. For example, in FIG. 5, item Q can be inserted after item D and an inserted-type change notification can be sent to the client. As with moves, the client's access can be limited when performing insertions. For example, the client can be allowed to observe the neighbors of any item, but not indices for items.

Additionally, the technique can include comparing contents of items that appear in both the original local data representation (510) and the updated local data representation (530). For items whose contents have changed, the items can be updated in the local data representation and changed-type change notifications can be sent to the client. Again, the client's access can be limited during this operation, so that anything except indices can be observed by the client.

The technique can further identify items that appear in the original local data representation (510) and the updated local data representation (530) whose indices have changed. For example, in the example of FIG. 5, indices for items E and G can be changed and index changed-type change notifications can be sent to the client. During this operation, the client's access can be limited so that it can observe the old and new index of the changing item, but no other indices.

The technique can also include matching placeholders, which have not yet been matched to an item and are on the periphery of ranges in the original local data representation (510) to items outside the marked boundaries of the received updated data items (520). Indices of placeholders from the original local data representation (510) can be updated based on the items they are matched to, or their adjacency to instantiated items or other placeholders. After this is done, limits on the client's access can be removed, and the client can be allowed to access the local data representation in the client's usual manner.

Placeholders that are matched to items in the received updated data items (520) can be instantiated with the matched items in the local data representation, and "item available" notifications can be sent. Additionally, if the overall count of items in the data set in the data source has changed (per information on the overall count being sent from the data source to the items manager or the data source returning the last data item in the data source list), then a count changed-type change notification can be sent to the client to indicate this change.

In the example of FIG. 5, the operations of the refresh technique discussed above can result in the original local data representation (510) at the top of FIG. 5 being updated to the updated local data representation (530) illustrated at the bottom of FIG. 5, and in appropriate change notifications being sent to the client. Other techniques could be used to do this in other ways that would be logical for the change notifications being sent at the time. For example, the order of the operations in the techniques discussed above could be changed so long as they still resulted in an orderly generation of the change notifications that can be properly processed by the client.

After the refresh operation has completed, the fetching of requested items for which there are still placeholders in the local data representation can resume. Such placeholders may have been present in the original local data representation (510), and/or they may have been inserted due to client requests for data during the refresh technique discussed above. For example, in the example of FIG. 5, this can result in fetching an item corresponding to the placeholder in the updated local data representation (530). Accordingly, items can be fetched properly even if results from requests to the data source initiated prior to the refresh operation are ignored to simplify keeping the local data representation consistent at the end of the refresh technique.

III. Techniques for Optimistic Application of Data Edits

Several techniques for optimistic application of data edits will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause at least one processor to perform the technique.

Figure 6:
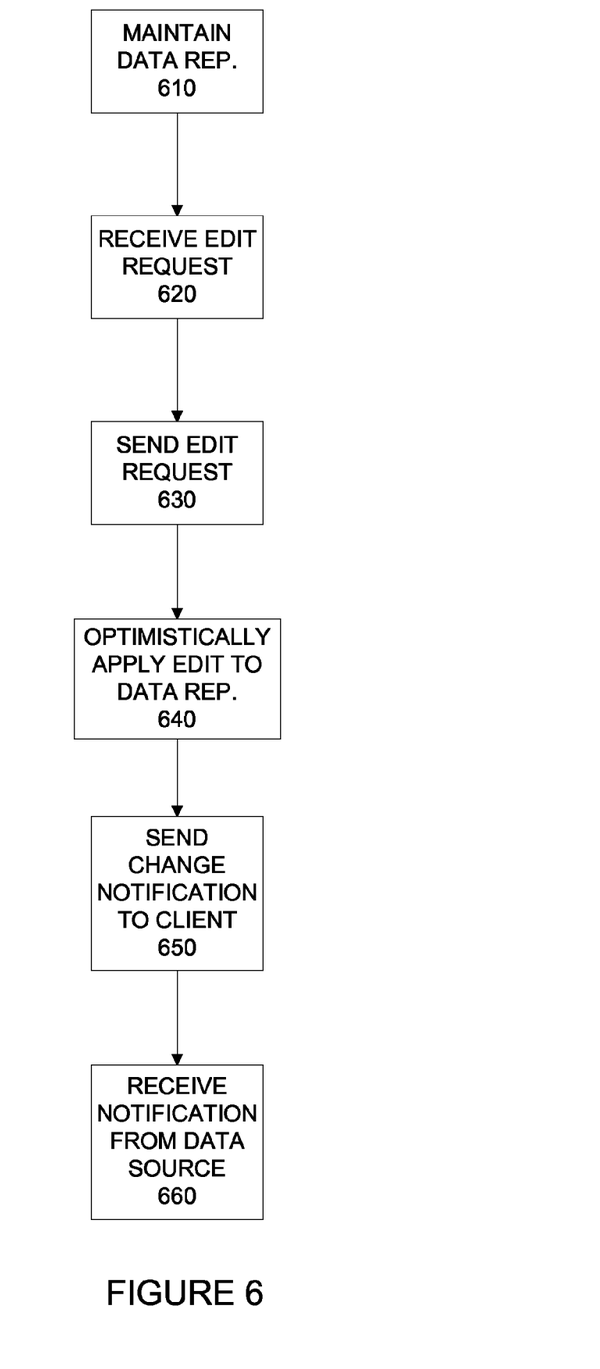
FIG. 6 is a flowchart of a technique for optimistic application of data edits.

Referring to FIG. 6, a technique for optimistic application of data edits will be described. The technique can include maintaining (610) a data representation that represents source data at a data source. A request to perform an edit can be received (620) from a client, and a request can be sent (630) to the data source to make the edit to the source data. The edit can be optimistically applied (640) to the data representation. The technique can include sending (650) a change notification to the client. The change notification can indicate one or more changes to the data representation. The change(s) can be change(s) resulting from applying (640) the edit to the data representation. Additionally, a notification can be received (660) from the data source after applying (640) the edit to the data representation and after sending (650) the change notification. The notification from the data source can indicate whether the edit to the source data succeeded. The requests and notifications with the client may be made using various different types of communication types, such as application programming interface calls, cross-process messages, etc.

The technique can further include maintaining a queue of edits to be made to the source data. Maintaining the queue may also include removing an entry for the edit from the queue after receiving a notification that the edit was successfully made to the source data. The technique may include receiving from the data source a notification that the edit failed, undoing edits made to the data representation from edits in the queue, and discarding the edits in the queue. Alternatively, subsequent edits in the queue that depended on the failed edit could be identified, and those edits could be dequeued, without dequeueing other edits in the queue. Where the edit is a deletion edit, the failed edit may be discarded from the queue, and the edits in the queue other than the failed edit may continue to be processed.

The technique of FIG. 6 may include detecting an inconsistency between the data representation and the source data, and conducting a refresh operation for the data representation after attempting to complete edits in the edit queue.

The technique of FIG. 6 may include sending an edit result notification to the client after receiving the notification from the data source. The edit result notification can indicate whether the edit to the data source succeeded. The technique of FIG. 6 may also include sending a status notification to the client. For example, the status notification may indicate whether there are outstanding edits to the source data that are not yet completed. As another example, the status notification may indicate whether there is currently a state of error in editing the source data. A connection to the data source may be lost while edits to the data source are in an edit queue. If so, the status notification can indicate a state of error in editing the source data, and the technique can further include requesting that the data source apply the edits in the queue after the connection to the data source is restored. Such request(s) to the data source may be done without the client re-requesting the edits.

A conflict between the edit and a current state of the source data may be detected. Such a conflicting edit is one that does not make sense in light of a current state of the source data. For example, the edit may be asking for an item that no longer exists to be deleted, moved, etc. In such situations, a no longer meaningful notification may be received back from the data source. In response to detecting that the edit conflicts with the current state of the source data, the data representation can be refreshed to synchronize the data representation with the current state of the source data.

Figure 7:
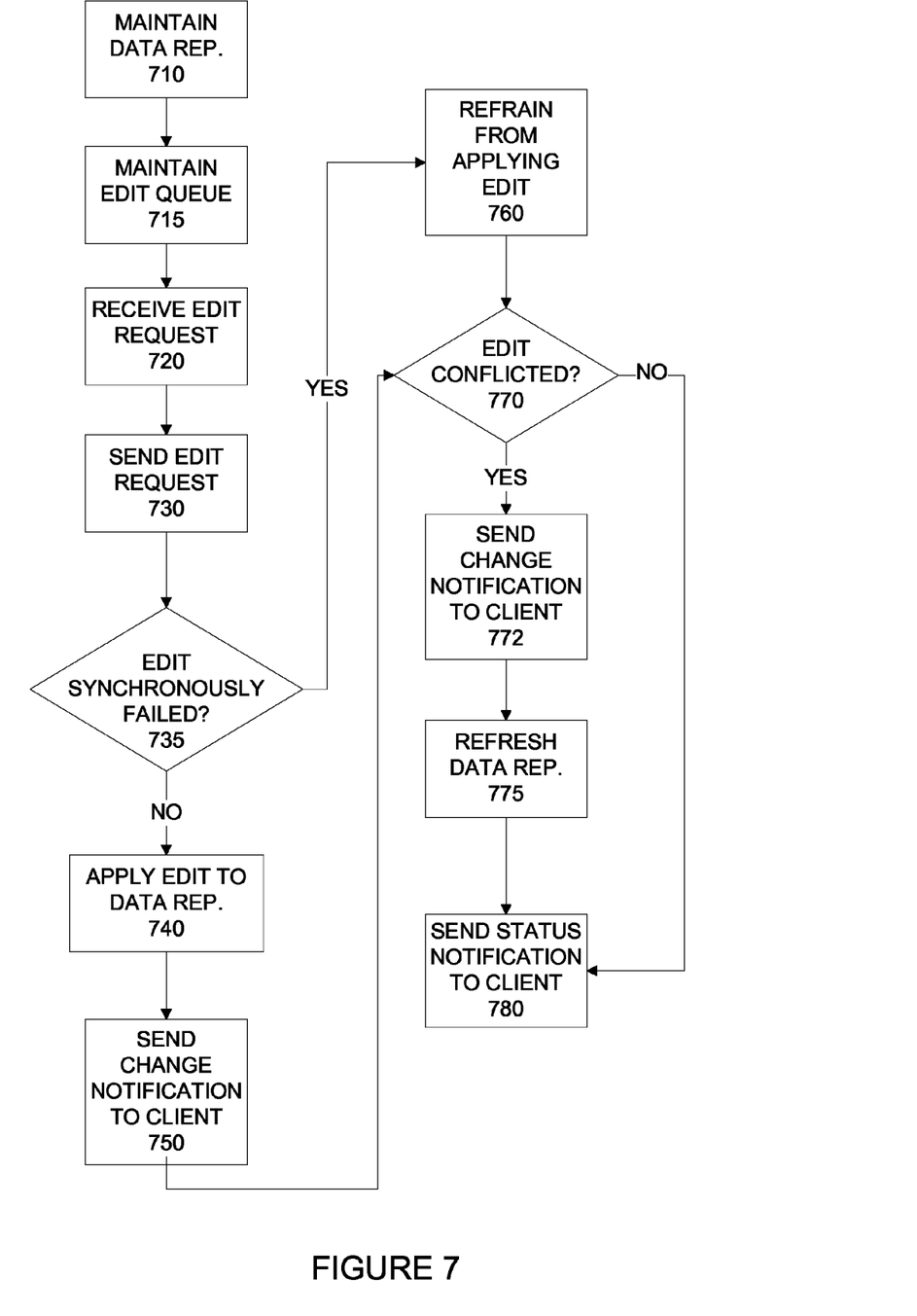
FIG. 7 is a flowchart of another technique for optimistic application of data edits.

Referring now to FIG. 7, another technique for optimistic application of data edits will be described. The technique can include maintaining (710) a data representation representing source data at a data source. The technique can further include maintaining (715) a queue of edits to be made to the source data. A request to perform an edit can be received (720) from a client, and a request to make the edit to the source data represented by the data representation can be sent (730) to the data source. It can be determined (735) whether the edit to the source data synchronously failed. If not, then the edit can be applied (740) to the data representation, and a change notification can be sent (750) to the client, without waiting to be notified as to whether the edit to the source data succeeded. The change notification can indicate one or more changes to the data representation resulting from the application (740) of the edit to the data representation.

The technique of FIG. 7 may include refraining (760) from applying the edit to the data representation if the edit to the source data synchronously failed. Also, maintaining (715) edits can include removing an entry for the edit from the queue after receiving a notification that the edit was successfully made to the source data. The technique may include receiving from the data source a notification that the edit failed, undoing edits made to the data representation from edits in the edit queue, and discarding the edits in the edit queue.

Also, it can be determined (770) whether an edit conflicted with the source data (e.g., the edit is attempting to move an item that no longer exists, the edit is attempting to modify an item that no longer exists, etc.). If so, then a change notification can be sent (772) to the client to undo the conflicting edit and the data representation may be refreshed (775).

The FIG. 7 technique may further include sending (780) a status notification to the client, where the status notification indicates whether there are outstanding edits to the source data that are not yet completed and/or whether there is currently a state of error in editing the source data. When a connection to the data source is lost while edits to the data source are in an edit queue, the status notification can indicate a state of error in editing the source data, and the technique may further include requesting that the data source perform the edits in the queue after the connection to the data source is restored, without the client re-requesting the edits.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
a computing component, which is different from a data source and different from a client, performing the following acts:
maintaining a data representation that represents source data at the data source;
receiving a request from the client to perform a first edit;
sending a request to the data source to make the first edit to the source data;
determining that a failure notice for the first edit has not been received from the data source prior to a first response threshold time;
in response to determining that a failure notice for the first edit has not been received from the data source prior to the first response threshold time, performing the following:

applying the first edit to the data representation optimistically;

sending a change notification to the client, the change notification indicating one or more changes to the data representation, the one or more changes to the data representation resulting from application of the first edit to the data representation;

receiving a notification from the data source after applying the first edit to the data representation and after sending the change notification, the notification from the data source indicating whether the first edit to the source data succeeded;

receiving a request from the client to perform a second edit;

sending a request to the data source to make the second edit to the source data represented by the data representation;

determining that a failure notice for the second edit has been received from the data source prior to a second response threshold time; and in response to determining that a failure notice for the second edit has been received from the data source prior to a second response threshold time, the computing component refraining from applying the second edit to the data representation.

2. The method of claim 1, further comprising sending an edit result notification to the client after receiving the notification from the data source, the edit result notification indicating whether the first edit to the data source succeeded.

3. The method of claim 1, further comprising the computing component, which is different from the data source and from the client, sending a status notification to the client.

4. The method of claim 3, wherein the status notification indicates whether there are outstanding edits to the source data that are not yet completed and are still scheduled to be completed.

5. The method of claim 3, wherein the status notification indicates whether there is currently a state of error in editing the source data.

6. The method of claim 1, further comprising:
detecting that the first edit conflicts with a current state of the source data; and
refreshing the data representation in response to detecting that the first edit conflicts with the current state of the source data.

7. The method of claim 1, wherein the client is an application.

8. The method of claim 1, wherein the client is a control.

9. The method of claim 1, wherein the acts performed by the computing component further comprise maintaining a queue of edits to be made to the source data, the edits represented by entries in the queue comprising one or more edits that have already been applied in the data representation, maintaining the queue comprising removing an entry for the first edit from the queue in response to receiving a notification from the data source that the first edit was successfully made to the source data.

10. The method of claim 9, wherein the notification from the data source indicates that the first edit failed, and wherein the method further comprises:
undoing edits made to the data representation from edits in the queue; and
discarding the edits from the queue.

11. The method of claim 9, wherein the notification from the data source indicates that the first edit failed, wherein the first edit is a deletion edit, and wherein the method further comprises:

discarding the deletion edit from the queue without undoing the deletion edit in the data representation; and
continuing processing of edits in the queue other than the deletion edit, the edits in the queue other than the deletion edit being edits that had been in the queue at the same time as the deletion edit.

12. The method of claim 9, further comprising:
detecting an inconsistency between the data representation and the source data; and
conducting a refresh operation for the data representation after attempting to complete edits in the edit queue.

13. The method of claim 9, wherein:
the method further comprises the computing component, which is different from the data source and from the client, sending a status notification to the client;
a connection to the data source is lost while edits to the data source are in the edit queue;
the status notification indicates a state of error in editing the source data; and
the method further comprises the computing component requesting that the data source perform the edits in the queue after the connection to the data source is restored, without the client re-requesting the edits.

14. A computer system comprising:
at least one processor comprising hardware; and
memory comprising instructions stored thereon that when executed by at least one processor cause at least one processor to perform acts comprising:
a computing component maintaining a data representation representing source data at a data source;
the computing component receiving a request from a client to perform a first edit, the computing component being different from the data source and different from the client;
the computing component sending a request to the data source to make the first edit to the source data represented by the data representation;
the computing component determining that a failure notice for the first edit has not been received from the data source prior to a first response threshold time;
in response to the computing component determining that a failure notice for the first edit has not been received from the data source prior to the first response threshold time, the computing component performing acts comprising:
applying the first edit to the data representation, without waiting to be notified as to whether the first edit to the source data succeeded;
sending a change notification to the client without waiting to be notified as to whether the first edit to the source data succeeded, the change notification indicating one or more changes to the data representation resulting from application of the first edit to the data representation;
the computing component receiving a request from the client to perform a second edit;
the computing component sending a request to the data source to make the second edit to the source data represented by the data representation;
the computing component determining that a failure notice for the second edit has been received from the data source prior to a second response threshold time; and
in response to the computing component determining that a failure notice for the second edit has been received from the data source prior to a second response threshold time, the computing component refraining from applying the second edit to the data representation.

15. The computer system of claim 14, wherein the acts further comprise the computing component maintaining a queue of edits to be made to the source data, the edits represented by entries in the queue comprising one or more edits that have already been applied in the data representation, and maintaining the queue comprising removing an entry for the first edit from the queue after receiving a notification that the first edit was successfully made to the source data.

16. The computer system of claim 14, wherein the acts further comprise:
   maintaining a queue of edits to be made to the source data;
   receiving from the data source a notification that the first edit failed;
   undoing edits made to the data representation from edits in the edit queue; and
   discarding the edits in the edit queue.

17. The computer system of claim 14, wherein the acts further comprise the computing component sending a status notification to the client, the status notification indicating whether there are outstanding edits to the source data that are not yet completed and are still scheduled to be completed, and whether there is currently a state of error in editing the source data.

18. The computer system of claim 14, wherein:
   the acts further comprise the computing component sending a status notification to the client;
   the status notification indicates a state of error in editing the source data after a connection to the data source has been lost while edits to the data source are in an edit queue maintained by the computing component; and
   the acts further comprise requesting that the data source perform the edits in the queue after the connection to the data source is restored, without the client re-requesting the edits.

19. The computer system of claim 14, wherein the acts further comprise:
   detecting that the first edit is a conflicting edit; and
   refreshing the data representation in response to detecting that the first edit is a conflicting edit.

20. One or more computer-readable storage media having computer-executable instructions embodied thereon that, when executed by at least one processor, cause at least one processor to perform acts comprising:
   an items manager computing component maintaining a data representation representing source data at a data source, the items manager being different from the data source;
   the items manager receiving a request from a client to perform a first edit, the items manager being different from the client;
   the items manager sending a request to the data source to make the first edit to the source data represented by the data representation;
   the items manager determining that a failure notice for the first edit has not been received from the data source prior to a first response threshold time; and
   in response to the items manager determining that a failure notice for the first edit has not been received from the data source prior to the first response threshold time, the items manager performing acts comprising:
      applying the first edit to the data representation, without waiting to be notified as to whether the first edit to the source data succeeded; and
      sending a change notification to the client without waiting to be notified as to whether the first edit to the source data succeeded, the change notification indicating one or more changes to the data representation resulting from application of the first edit to the data representation;
   the items manager receiving a request from the client to perform a second edit;
   the items manager sending a request to the data source to make the second edit to the source data represented by the data representation;
   the items manager determining that a failure notice for the second edit has been received from the data source prior to a second response threshold time; and
   the items manager refraining from applying the second edit to the data representation in response to the items manager determining that a failure notice for the second edit has been received from the data source prior to a second response threshold time.

* * * * *